(12) United States Patent
Petitfrere et al.

(10) Patent No.: US 8,028,545 B2
(45) Date of Patent: Oct. 4, 2011

(54) METHOD AND APPARATUS FOR MANUFACTURING LOW OH OVERCLADDING

(75) Inventors: Emmanuel Petitfrere, Villeneuve D'Asq (FR); Laurent Calvo, Lille (FR); Cedric Gonnet, Paris (FR)

(73) Assignee: Draka Comteq B.V., Amsterdam (NL)

( * ) Notice: Subject to any disclaimer, the term of this patent is extended or adjusted under 35 U.S.C. 154(b) by 993 days.

(21) Appl. No.: 11/615,727

(22) Filed: Dec. 22, 2006

(65) Prior Publication Data
US 2007/0163299 A1    Jul. 19, 2007

(30) Foreign Application Priority Data
Dec. 23, 2005    (FR) ...................................... 05 13254

(51) Int. Cl.
*C03B 37/07* (2006.01)
(52) U.S. Cl. ................ 65/379; 65/413; 65/421; 65/391; 65/436; 65/412
(58) Field of Classification Search ...................... 65/379, 65/413, 421, 391, 436, 412
See application file for complete search history.

(56) References Cited

U.S. PATENT DOCUMENTS

| | | | | |
|---|---|---|---|---|
| 4,317,667 A | * | 3/1982 | Spainhour | 65/27 |
| 4,440,558 A | * | 4/1984 | Nath et al. | 65/391 |
| 4,552,576 A | * | 11/1985 | Hara et al. | 65/378 |
| 2002/0162363 A1 | * | 11/2002 | Wada et al. | 65/414 |
| 2003/0019245 A1 | * | 1/2003 | Drouart et al. | 65/414 |
| 2006/0242998 A1 | * | 11/2006 | Shirley | 65/427 |

FOREIGN PATENT DOCUMENTS

| | | |
|---|---|---|
| EP | 0 401 742 A1 | 12/1990 |
| EP | 0 863 108 A1 | 9/1998 |
| WO | WO 03/072517 A | 9/2003 |

* cited by examiner

Primary Examiner — Queenie Dehghan
(74) Attorney, Agent, or Firm — Sughrue Mion, PLLC

(57) ABSTRACT

The invention relates to a method for manufacturing a final optical fiber preform by overcladding, said method comprising the steps of providing a primary preform; positioning said primary preform within at least one tube, wherein the at least one tube partly covers the primary preform to create a zone to be overcladded, being an overclad zone, which overclad zone is located on the primary preform outside the at least one tube; injecting a gas into the annular space between the primary preform and the at least one tube under overpressure relative to the pressure outside the at least one tube; overcladding the primary preform in the overclad zone with an overcladding material using an overcladding device. The invention also relates to an apparatus for carrying out the method. The invention allows overcladding a primary preform at low cost while maximally limiting the incorporation of impurities into the silica overclad.

14 Claims, 1 Drawing Sheet

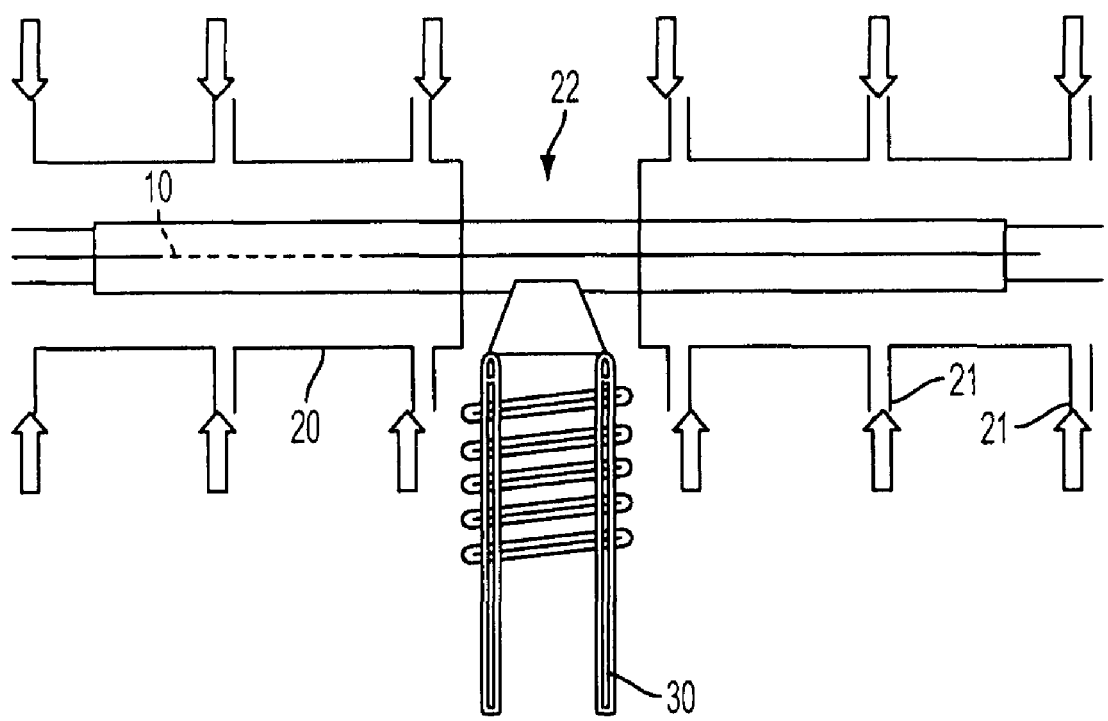
FIGURE

METHOD AND APPARATUS FOR MANUFACTURING LOW OH OVERCLADDING

BACKGROUND OF THE INVENTION

The present invention relates to a method for manufacturing an optical fiber preform. An optical fiber is made by drawing a preform on a draw tower. A preform generally comprises a primary preform consisting of a glass tube of very high quality which forms part of the cladding and the core of the fiber. This primary preform then undergoes a overcladding or sleeving process to increase its diameter and to form a preform which can be used on a draw tower. In this context, the term inner cladding is given to the cladding formed inside the tube, and outer cladding to the cladding formed outside the tube. The homothetic drawing operation consists of placing the preform vertically in a tower and drawing a strand of fiber from one end of the preform. For this purpose, high temperature is applied locally to one end of the preform until the silica is softened, and the drawing speed and temperature are then permanently controlled during the fiber drawing operation since they determine the diameter of the fiber.

An optical fiber conventionally consists of an optical core, whose function is to transmit and optionally amplify an optical signal, and an optical cladding whose function is to confine the optical signal within the core. For this purpose, the refractive indexes of the core $n_c$ and of the outer cladding $n_g$ are such that $n_c > n_g$. As is well known, the propagation of an optical signal in a single-mode optical fiber breaks down into a fundamental mode guided in the core, and into secondary modes guided over a certain distance in the core-cladding assembly and called cladding modes.

An optical fiber may be made from a preform comprising a primary preform consisting of a tube of pure or doped silica in which layers of doped and/or pure silica are successively deposited to form an inner cladding and a central core. The deposits made in the tube are of the type of Chemical Vapor Deposits, abbreviated to CVD. This type of deposit is made by injections of gaseous mixtures into the tube and ionizing said mixtures. The CVD-type deposit includes Modified Chemical Vapor Deposition (MCVD), Furnace Chemical Vapor Deposition (FCVD) and Plasma Enhanced Chemical Vapor Deposition (PCVD).

After depositing the layers corresponding to the core and inner cladding, the tube is closed on itself during a so-called collapsing operation. This produces the primary preform consisting of a silica rod. This primary preform then undergoes a overcladding process, generally with natural silica particles for cost-related reasons. For overcladding, a plasma deposit method may be used during which the natural silica particles are deposited and fused by a plasma torch under a temperature in the region of 2300° C. so that they vitrify on the periphery of the primary preform. The primary preform is caused to rotate around itself and the torch or the primary preform moves longitudinally, one with respect to the other, to ensure uniform depositing of silica around the entire periphery of the rod. The overcladding process is generally conducted in an enclosed unit under a controlled atmosphere to ensure protection against electromagnetic perturbations and the release of ozone by the plasma torch.

Overcladding by plasma deposit using silica particles is low cost, but it produces impurities which are deposited on the periphery of the primary preform. These impurities, such as water and dust particles, are derived from ambient air in the unit in which the overcladding operation is conducted. The presence of impurities in the outer cladding—formed when overcladding the primary preform—deteriorates the optical properties of the fiber, in particular when impurities are present in the first layers of silica deposited on the primary preform. This problem of impurities incorporated during overcladding becomes greater the larger the size of the central core of the primary preform. When the central core has a large diameter, the inner cladding is of limited thickness and the impurities incorporated around the periphery of the tube during the overcladding have an impact on the propagation of the signal within the central core that increases the closer they lie to the core.

Yet it is sought to manufacture preforms of large capacity. The capacity of a preform is defined as the quantity of optical fiber length which may be drawn from this preform. For preforms having the same lengths, the greater the diameter of the preform, the greater its capacity. To reduce manufacturing costs and limit connection losses, it is desirable to provide long lengths of linear fibers from one and the same preform. It is therefore sought to manufacture large diameter preforms whilst complying with relative size constraints between the diameter of the central core and the diameter of the optical cladding. The final preform after overcladding has the same ratios of core diameter to cladding diameter as the drawn optical fiber. To manufacture a large capacity preform it is generally chosen to increase the quantity of overclad rather than to increase the diameter of the primary preform which is costly to manufacture.

US 2002/0144521 describes a method for manufacturing a large capacity preform. This document suggests making a primary preform by depositing a large diameter central core inside a tube doped with Chlorine and Fluorine. The tube is doped with Fluorine to compensate for the increase in the refractive index generated by doping with Chlorine. The tube is doped with Chlorine to limit the migration of OH group impurities which deteriorate the optical transmission properties in the central core. The use of such a tube doped with Chlorine and Fluorine, tube diameters being equal, makes it possible to reduce the thickness of the inner cladding deposited in the tube in order to manufacture a primary preform having a central core having an enlarged diameter. This primary preform is then overcladded by plasma deposit to obtain a final preform of large diameter and hence of large capacity. The tube doped with Chlorine and Fluorine protects the central core against impurities brought by the overcladding process using natural silica particles.

However, such a method requires the use of a specific tube, more costly than a tube of pure silica. In addition, the presence of Chlorine in the tube does not prevent the formation of Si—OH bonds on the tube surface during the overcladding operations which modify the global index of the outer cladding and consequently the transmission properties of the optical fiber.

FR-A-2 760 449 describes a method for depositing silica on an optical fiber primary preform. This document proposes purifying the natural silica deposit during the overcladding operation. A supply pipe supplies a gaseous mixture containing Chlorine or Fluorine to the plasma torch to cause the removal of the alkaline or alkaline-earth elements that are contained in the silica particles in order to reduce the formation of OH groups on the primary preform.

It has been found however that it is not at the plasma torch that the impurities are incorporated in the silica overclad since the temperature, around 2300° C., is too high to promote the formation of bonds with the OH groups. The impurities are especially deposited in the silica when it has just vitrified on the surface of the tube before it cools. The addition of a gaseous mixture containing Chlorine or Fluorine at the plasma torch does not therefore sufficiently reduce the formation of impurities in the silica overclad.

FR-A-2 64 describes a method and device for depositing silica on an optical fiber primary preform. The rod of silica forming the primary preform is placed on a lathe in a sealed enclosure separated from ambient atmosphere and supplied with dried gas. The overcladding operation is conducted inside this enclosure. The air in the enclosure is successively subjected to filtration, compression and refrigeration, to purging with condensed water then final drying by adsorption. With said process it is possible, in theory, to eliminate most of the impurities likely to be incorporated in the silica overclad. However this is a complex solution and one which is costly to implement. The volume of the enclosure is at least 8 to 10 $m^3$ and requires an air flow through the enclosure of around 3000 $m^3$/h. To subject such a volume of air to the above-mentioned filtering and drying operations represents a very high operating cost, incompatible with the manufacturing costs of optical fibers.

There is therefore a need for a method of manufacturing an optical fiber preform with which it is possible to conduct the overcladding operation at low cost whilst limiting to a maximum the incorporation of impurities into the silica overclad.

SUMMARY OF EXEMPLARY EMBODIMENTS OF THE PRESENT INVENTION

For this purpose, the invention proposes positioning the rod of the primary preform through at least one tube delimiting a reduced controlling volume, formed by the annular space between the primary preform and the at least one tube. The atmosphere is then controlled solely within this reduced volume delimited by the at least one tube, and not in the entire volume of an enclosure containing the lathe. An overclad zone as mentioned in the present description means the zone in which overcladding takes place by an overcladding device. The at least one tube covers the primary preform in a zone close to an overclad zone.

More particularly the invention proposes a method for manufacturing a final preform for an optical fiber by overcladding, said method comprising the steps of:
  providing a primary preform;
  positioning the primary preform within at least one tube wherein the at least one tube partly covers the primary preform to create a zone to be overcladded, being an overclad zone, which overclad zone is located on the primary preform outside the at least one tube;
  injecting a gas into the annular space between the primary preform and the at least one tube under overpressure relative to the pressure outside the at least one tube;
  overcladding the primary preform in the overclad zone with an overcladding material using an overcladding device.

It is preferred that the at least one tube has an inner diameter comprised between 4 to 10 times the outer diameter of the primary preform. This allows for optical protection of the primary preform to the outside atmosphere while limiting the annular space of which the atmosphere needs to be controlled by injecting gas and hence limiting the required amount of gas.

In addition, in a preferred embodiment the at least one tube has a length comprised between 0.3 and 0.8 times the length of the primary preform. This allows for optical protection of the primary preform to the outside atmosphere while limiting the annular space of which the atmosphere needs to be controlled by injecting gas and hence limiting the required amount of gas.

According to one embodiment, the present invention provides a method for manufacturing a final optical fiber preform comprising the steps of:
  providing a primary preform;
  positioning said primary preform within a tube having a diameter comprised between 4 to 10 times the diameter of the primary preform and a length comprised between 0.3 and 0.8 times the length of the primary preform;
  injecting gas into the tube under overpressure relative to the pressure outside the tube;
  overcladding the primary preform.

In one preferred embodiment, the injected gas is nitrogen and in another preferred embodiment the gas is air. Nitrogen and air are preferred because of the low concentration of contaminants and the low cost.

Gas is preferable injected during a large part and more preferable during the entire process of overcladding in order to ensure that contaminants are prevented from depositing during overcladding.

According to one embodiment, the relative moisture content of the injected gas is less than 5% at 20° C. The advantage of this relative moisture content is that the low amount of water present ensures low OH contamination of the silica to be deposited during overcladding.

According to one embodiment, the injected gas moreover contains fluorinated and/or chlorinated gases. This will inhibit any formation of OH groups in the at least one tube volume and prevents Si—OH bonds to form on the surface of the preform.

According to one embodiment, the overpressure inside the annular space between the primary preform and the at least one tube relative to the pressure outside the at least one tube ranges from 0.1 bar to 1 bar.

According to one embodiment, the injected gas is heated to a temperature of between 300° C. and 600° C. The reason for this is that the overcladding process is not delayed by undesired cooling. The injected gas is heated prior to injection.

According to one embodiment, the overcladding is conducted by plasma depositing of silica particles, such as natural silica particles. The advantage of plasma depositing is that the silica particles are directly vitrified and that no additional step of sintering is required. The advantage of natural silica particles is the great abundance and low cost.

According to one embodiment, the at least one tube comprises an opening transverse to the longitudinal axis of the at least one tube to allow the passing of an overcladding device, such as for example a plasma torch, and the insertion of silica particles. This configuration allows for a maximum amount of injected gas to be present in the overclad zone at the time of overcladding, thus ensuring optimal projection against contaminants.

According to one embodiment, the at least one tube is of quartz. According to another embodiment the at least one tube is of stainless steel. The advantage of the use of quartz or stainless steel is the high heat resistance and high robustness of the materials.

According to one embodiment, the primary preform is positioned within two tubes, the two tubes being on either side of the overclad zone and wherein the two tubes each cover a zone on the primary preform close to the overclad zone. The advantage of such a configuration is that there is sufficient room in between the two tubes for allowing the passing of the overcladding device and the overcladding material.

According to one embodiment, the at least one tube is held in stationary position while the primary preform is moved in translation along its axis of symmetry. In principle it is possible to move only the primary preform while the at least one tube is stationary, or to move only the at least one tube while the primary preform is stationary or to move both the primary preform and the at least one tube. If a plasma torch is present in an opening of the at least one tube, the plasma torch needs to be moved together with the at least one tube if the at least one tube is moving in translation. The advantage of holding the at least one tube stationary is that only the primary preform needs to be moved and not both at least one tube and the overcladding device, such as e.g. a plasma torch.

According to one embodiment, the at least one tube is moved jointly with a plasma torch along the axis of symmetry of the primary preform.

The invention also concerns an apparatus for manufacturing a final optical fiber preform comprising:
- a support to receive a primary preform;
- at least one tube being arranged to surround the primary preform received by the support, thus forming an annular space between the primary preform and the at least one tube, said at least one tube partly covers said primary preform to create a zone to be overcladded, being an overclad zone, which overclad zone is located on the primary preform outside the at least one tube;
- a gas reservoir adapted for injecting gas into the annular space between the primary preform and the at least one tube under overpressure relative to the pressure outside the at least one tube;
- a device for overcladding the primary preform in the overclad zone.

It is preferred that the at least one tube has a diameter comprised between 4 to 10 times the diameter of the primary preform. The advantage of this is disclosed before.

In addition, it is preferred that the at least one tube has a length comprised between 0.3 and 0.8 times the length of the primary preform. The advantage of this is disclosed before.

In one embodiment, the present invention relates to an apparatus for manufacturing a final optical fiber preform comprising:
- a support to receive a primary preform;
- at least one tube having a diameter comprised between 4 to 10 times the diameter of the primary preform and a length comprised between 0.3 and 0.8 times the length of the primary preform, the at least one tube being arranged to surround the primary preform attached to the support;
- a gas reservoir adapted for injecting gas into the annular space between the at least one tube and the primary preform under overpressure with respect to the pressure outside the at least one tube;
- a device for overcladding the primary preform.

An advantage of the apparatus of the present invention is that it allows for overcladding to be carried out in a controlled atmosphere without the need for large amount of gasses to be used.

According to one embodiment, the apparatus comprises a device for measuring and controlling the level of moisture in the at least one tube. This allows for a precise control of the level of water in the controlled atmosphere and hence OH impurities can be prevented as good as possible.

According to one embodiment, the apparatus comprises a device for measuring and controlling the pressure in the annular space. This allows to keep overpressure in the at least one tube, which holds any contaminant outside the at least one tube.

According to one embodiment, the apparatus comprises a device for heating the gases to be injected into the annular space. The advantages of heating the injected gasses have been described in the foregoing description.

According to one embodiment the apparatus comprises a plasma torch and an inlet duct for the silica particles. This allows for the use of plasma deposition of silica particles, the advantages of which have been described in the foregoing description.

It is preferred that the apparatus comprises two tubes on either side of the overclad zone.

Other characteristics and advantages of the invention will become apparent on reading the detailed description below of embodiments of the invention given solely by way of example and with reference to the sole FIGURE showing schematic elements for implementing the method of the invention.

BRIEF DESCRIPTION OF THE DRAWINGS

In order to understand the invention and to see how it may be carried out in practice, illustrative embodiments will now be described, by way of non-limiting examples only, with reference to the accompanying drawing, in which:

Sole FIGURE shows a primary perform intended to be placed on a lathe for overcladding in order to form a final preform according to an exemplary, non-limiting embodiment of the present invention.

DETAILED DESCRIPTION OF EXEMPLARY EMBODIMENTS

The sole FIGURE shows a primary preform 10 intended to be placed on a lathe for overcladding in order to form a final preform which can be used on a draw tower. The primary preform 10 is a rod of highly pure silica manufactured according to any known technique such as PCVD deposit for example in a silica tube.

Overcladding may be effected by plasma depositing silica particles, preferably natural silica particles that are less costly. An inlet duct for the silica particles is preferably provided close to a plasma torch. Either the assembly consisting of the plasma torch and the inlet duct for the silica particles is moved forwards and backwards along the rotating primary preform 10, or the rotating primary preform 10 moves forwards and backwards in a longitudinal movement in front of the plasma torch and the inlet duct for the silica particles.

According to the invention, the primary preform 10 is positioned by moving it inside at least one tube 20 of two tubes 20 which cover(s) a zone close to the overclad zone of the primary preform 10. The atmosphere is then controlled in the volume defined by the annular space between the primary preform 10 and the at least one tube 20 to eliminate depositing of impurities on the primary preform 10 during overcladding. The volume of atmosphere (air) to be controlled is reduced with respect to the prior art enclosure but sufficient to ensure good quality of the silica deposited during the overcladding operation.

The inner diameter of the at least one tube 20 is between 4 times and 10 times the outer diameter of the primary preform 10. The at least one tube 20 is therefore sufficiently wide so as not to hamper overcladding operation and sufficiently narrow to limit the volume of atmosphere (air) to be controlled in the overclad zone. To draw a final optical fiber with a diameter of 125 µm and a core of 8.7 µm, a primary preform 10 can be used whose core has a diameter of 6 mm with a diameter of 25 mm overcladded to reach a diameter of 100 mm on the final preform in order to comply with the homothetic nature of the fiber. For said primary perform, one will be able to provide at least one tube of diameter 150 mm for example, i.e. sufficiently wide to allow overcladding of the primary preform 10 and sufficiently narrow to guarantee a properly controlled atmosphere in the overclad zone.

The atmosphere is controlled in the annular space between the preform 10 and the at least one tube through the injection of gas under overpressure relative to the pressure outside the at least one tube into the annular space between the preform 10 and the at least one tube 20. Gas inlet pipes 21 are preferably distributed along the at least one tube 20 (as depicted in FIG. 1) to inject gas in a controlled manner into the annular space between the preform 10 and the at least one tube with sufficient overpressure relative to the pressure outside the at least one tube to guarantee that ambient air does not enter into the at least one tube 20. Two gas inlets 21 could be sufficient, but it is preferred to distribute six to twenty gas inlets 21 along and around the at least one tube 20 to ensure uniform overpressure inside the at least one tube 20 or two tubes 20.

The length of the at least one tube ranges from 0.3 times to 0.8 times the length of the primary preform 10 to cover the zone or zones of the primary preform 10 which have just been overcladded without hampering attachment of the primary preform 10 to the lathe. As indicated previously, the impurities are deposited especially on the preform areas that are still hot where the silica particles have just vitrified, rather than on the zone heated by the plasma torch or on the zones that have already cooled. It was found that impurities incorporate themselves into the silica especially at between 1200° and 400°. The length of the at least one tube must therefore be sufficient to cover the primary preform 10 that is still hot. A primary preform 10 typically has a length of 1 m; at least one tube approximately 50 to 60 cm long would therefore be suitable or two tubes 20 having a smaller length, i.e. 20 to 30 cm long.

The volume of atmosphere to be controlled, delimited by tube 20, is therefore sufficiently small to permit the guaranteeing of a dust-free atmosphere with a largely reduced moisture level and at reasonable cost.

For example, reservoirs of pressurized air or nitrogen may be connected to the gas inlets 21 of the at least one tube 20. The stored gasses, for injection into the at least one tube 20, have a relative moisture value of less than 5% at 20° C. In addition, the air or nitrogen injected into the at least one tube 20 may be mixed with fluorinated and/or chlorinated gases to inhibit any formation of OH groups in the at least one tube 20 volume and to prevent Si—OH bonds on the surface of the preform 10. It is preferred to inject nitrogen rather than air to prevent the creation of NOx groups (gasses with greenhouse effect) even though the injection of air into the at least one tube 20 gives satisfactory results regarding the limitation of impurities deposited in the overclad. The gases injected into the at least one tube 20 may be previously filtered, although the use of reservoirs directly connected to the gas pipes connected to the inlet ducts 21 of the at least one tube 20 limits the risks of dust entering the at least one tube 20.

The gas (or gas mixture) is injected into the at least one tube 20 under overpressure with respect to the pressure outside the at least one tube 20. The pressure outside the at least one tube 20 is generally atmospheric pressure. In principle, a low overpressure may suffice to prevent air entering the at least one tube 20, but sufficient overpressure must be chosen to manage major air movements at the level of the plasma torch. An overpressure in the at least one tube 20 of between 0.1 bar and 1 bar is suitable. Said overpressure is sufficient to guarantee that the ambient air does not enter the at least one tube 20 bringing dust and moisture. Said overpressure is also sufficiently low so that it can be obtained by mere emptying of the reservoirs under pressure or with the addition of a low-power pump on the gas inlet duct at the at least one tube inlets.

The gas injected in the at least one tube 20 may also be heated to a temperature of between 300° C. and 600° C. to limit the rate of cooling of the preform area which has just been overcladded.

According to the illustrated embodiment, the at least one tube 20 comprises an opening 22 transverse to the longitudinal axis of the at least one tube 20 to allow the passing of the plasma torch 30 and insertion of silica particles in a median zone of tube 20. During the forward and backward movement of the primary preform 10 in front of the plasma torch 30, the at least one tube 20 can then be held stationary as well as the plasma torch, protecting the heated area of the preform 10 from impurities irrespective of the direction of movement of the preform 10. Other assemblies could be considered, however, in which the plasma torch 30 and the at least one tube 20 move jointly along the preform 10 that is stationary in translation.

The at least one tube 20 is made of a material withstanding strong temperatures, of quartz or stainless steel for example, since at least one of its ends—or one end of its central opening 22—lies in the vicinity of the plasma torch 30. The at least one tube 20 must cover a zone close to the overclad zone to avoid the occurring of impurities in the fused silica. On the other hand, the at least one tube 20 does not cover the zone directly heated by the plasma torch. This arrangement is therefore easy to implement.

The method of the invention can be implemented using relatively simple equipment. A conventional lathe may be used as a support for receiving the primary preform 10. At least one tube 20 of quartz or stainless steel whose diameter is 4 to 10 times the diameter of the primary preform 10 and whose length is 0.3 to 0.8 times the length of the primary preform 10 is positioned to surround the primary preform 10. Several tubes 20 may be arranged in the vicinity of the lathe to allow the overcladding of different primary preforms 10 under optimal conditions. Attachment means may be provided on the lathe that are adapted to receive at least one tube 20 of the invention. One or more reservoirs may be provided with attachment means to the at least one tube 20 inlets. A plasma torch of conventional type with an inlet duct of silica particles may also be also provided.

The equipment may also comprise means for controlling and regulating the pressure in the at least one tube 20 and means for controlling the moisture level in the at least one tube 20, for example using a standard pressure sensor and standard humidity sensor.

The overcladding operation of the primary preform 10 can therefore be performed with simple, low cost equipment which enables efficient reduction in the impurities incorporated into the silica overclad. An optical fiber having improved optical transmission properties may be drawn from a final preform obtained using the method of the invention.

The invention claimed is:

1. A method for manufacturing a final optical fiber preform by overcladding, said method comprising the steps of:
  providing a primary preform (10) including a tube of pure or doped silica in which layers of silica are successively deposited so that the primary perform includes an inner cladding and a central core;
  positioning said primary preform (10) within at least one tube (20), wherein the at least one tube (20) partly covers the primary preform (10) to create a zone to be overcladded, being an overclad zone, which overclad zone is located on a portion of the primary preform (10) not covered by the at least one tube (20);

injecting a gas into an annular space between the primary preform (10) and the at least one tube (20) under overpressure relative to the pressure outside the at least one tube (20);

alternately moving the primary perform and the at least one tube relative to each other in a forward and reverse direction so that the overclad zone moves along a length of the primary preform;

overcladding the primary preform (10) in the overclad zone with an overcladding material including silica particles using a plasma torch, wherein the at least one tube (20) is dimensioned to have a length between 0.3 and 0.8 times the length of the primary preform (10).

2. The method for manufacturing according to claim 1, wherein the at least one tube (20) has an inner diameter comprised between 4 to 10 times the outer diameter of the primary preform (10).

3. The method for manufacturing according to claim 1, wherein the injected gas is selected from nitrogen and air.

4. The method for manufacturing according to claim 1, wherein the injected gas has a relative moisture level being less than 5% at 20° C.

5. The method for manufacturing according to claim 1, wherein the injected gas contains fluorinated and/or chlorinated gases.

6. The method for manufacturing according to claim 1, wherein the overpressure in the annular space relative to the pressure outside the at least one tube (20) is comprised between 0.1 bar and 1 bar.

7. The method for manufacturing according to claim 1, wherein the injected gas is heated to a temperature comprised between 300° C. and 600° C.

8. The method for manufacturing according to claim 1, wherein the overcladding material consists of natural silica particles.

9. The method for manufacturing according to claim 1, further comprising the steps of:

providing an opening (22) in the at least one tube (20) such that said opening (22) extends transverse to the longitudinal axis of the at least one tube (20), said opening defining said overclad zone; and introducing the overcladding material into the opening.

10. The method for manufacturing according to claim 1, wherein the at least one tube (20) is made of quartz.

11. The method for manufacturing according to claim 1, wherein the at least one tube (20) is made of stainless steel.

12. The method for manufacturing according to claim 1, wherein the primary preform (10) is positioned within two tubes (20), the two tubes (20) being on either side of the overclad zone and wherein the two tubes (20) each cover a zone on the primary preform (10) close to the overclad zone.

13. The method for manufacturing according to claim 1, wherein the at least one tube (20) is held in a stationary position while the primary preform (10) is moved in translation along axis of symmetry of the primary preform (10).

14. The method for manufacturing according to claim 1, wherein the at least one tube (20) is moved in translation jointly with the overcladding device along the axis of symmetry of the primary preform (10).

* * * * *